UNITED STATES PATENT OFFICE.

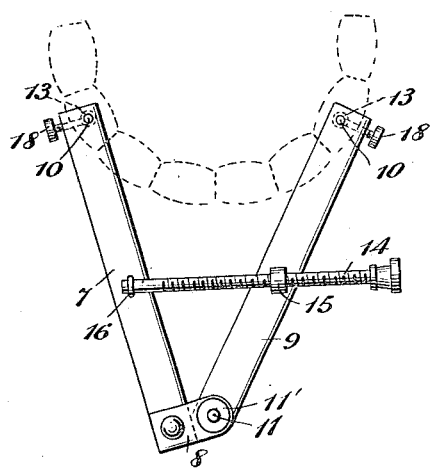

MORTON MAIER, OF NEW YORK, N. Y.

DENTAL TOOL.

1,125,576.  Specification of Letters Patent.  Patented Jan. 19, 1915.

Application filed April 25, 1914. Serial No. 834,341.

*To all whom it may concern:*

Be it known that I, MORTON MAIER, a citizen of the United States, and a resident of the city of New York, borough of Manhattan, in the county and State of New York, have invented a new and Improved Dental Tool, of which the following is a full, clear, and exact description.

The invention relates to dental tools for placing abutments or sockets parallelly into teeth, which sockets are intended to receive the pegs of a dental bridge.

The object of the invention is to provide a simple, convenient and inexpensive device which is neat in appearance and not bulky, so that the same will not inconvenience the patient when the measurement is taken, and so that any change in the operating parts for obtaining the exact distance may be made exteriorly of the patient's mouth.

I attain this object by the device illustrated in the accompanying drawings forming part of the specification, in which similar characters of reference indicate corresponding parts in all the views and wherein—

Figure 1 is a plan view of my device showing the application of the same; Fig. 2 is a plan view showing the device closed. Fig. 3 shows a side elevation of the device; Fig. 4 is a section on line 4—4, Fig. 2; Fig. 5 is a transverse, horizontal section on line 5—5, Fig. 3; and Fig. 6 is a modified structure of the ends of the dental tool.

Referring to the drawings, 7 represents one leg of the dental tool, which leg is provided at one end with oppositely disposed lateral flanges 8 rigidly secured thereto in any suitable way. Engaged with one end between the flanges 8 is another leg 9 which is mounted between said flanges by means of a pivot 11 which is in the shape of a screw provided with a head 11' whereby the second leg can be tightened to the flanges and, therefore, locked thereto. When the two legs are brought together, the facing sides of the legs are adapted to form a closed joint, as indicated in Fig. 2.

The unsecured ends of the legs 7 and 9 are each provided with a through bore 10, the axis of said bores 10 being parallel to the axis of the pivot 11 by means of which the leg 9 is secured to the leg 7, so that in any displacement of the free ends of the legs 7 and 9, the axis of the bores 10 remains parallel to the axis 11 of the pivot. Fitting removably into said bores 10 are shanks 12 of tools adapted to engage the sockets provided in the roots of the teeth. The shape of these tools may vary according to the sockets used in the roots, but the shanks of said tools fit snugly into the bores 10 and the axes of said shanks remain always parallel to the axis 11 of the pivot.

The proper distance between the bores 10 is obtained and maintained by means of a fine screw 14 engaged by a nut 15 threaded into one side of the leg 9, and also engaged by an eyelet 16 and threaded into the leg 7. The eyelet 16 is formed about a groove 17 provided at the end of the screw 14, so that the same will permit the turning of the screw, preventing its axial movement relatively to said eyelet and, therefore, to the leg 7. By threading the nut 15 and the eyelet 16 into the legs the same will be permitted to turn when the legs are moved relatively to each other and, therefore, there will be no stress on the screw 14.

The shanks 12 of the tool are prevented from displacement therein by means of set screws 18. The same result may be obtained by shaping the free ends of the legs 9 as shown in Fig. 6, whereby the resiliency of the ends will clamp the shank of the tool forced thereinto. It will be noted that the shanks of the tool engaged in the bores 10 are always perpendicular to the legs 9, so that their axes are parallel to the axis of the pivot of the device.

Having thus described my invention, I claim as new and desire to secure by Letters Patent:

In a device of the class described, a pair of legs, flanges rigidly secured to one end of one leg, means pivotally connecting one end of the other leg to said flanges, each of said legs having at the free end a bore the axis of which is parallel to the axis of the means pivotally connecting the legs, each leg having means adjacent said bore whereby a member engaged into said bores can be clamped thereto, a nut threaded into one of said legs, a screw engaging said nut, an eyelet screwed into the other of said legs and engaging one end of the screw whereby said screw is permitted to rotate but prevented from axial displacement relatively to the eyelet, substantially as and for the purpose set forth.

In testimony whereof I have signed my name to this specification in the presence of two subscribing witnesses.

MORTON MAIER.

Witnesses:
BENEDICT JOFFE,
PHILIP D. ROLLHAUS.

Copies of this patent may be obtained for five cents each, by addressing the "Commissioner of Patents, Washington, D. C."